(12) United States Patent
Andriantsiferana

(10) Patent No.: US 7,596,107 B1
(45) Date of Patent: Sep. 29, 2009

(54) SYSTEM AND METHOD FOR ENABLING MULTICAST GROUP SERVICES IN A NETWORK ENVIRONMENT

(75) Inventor: Laurent H. Andriantsiferana, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 845 days.

(21) Appl. No.: 10/766,180

(22) Filed: Jan. 26, 2004

(51) Int. Cl.
*H04H 20/71* (2008.01)

(52) U.S. Cl. .................. 370/312; 370/390; 370/392; 370/432

(58) Field of Classification Search .......... 370/310, 370/312, 351, 389, 390, 349, 392, 432
See application file for complete search history.

(56) References Cited

U.S. PATENT DOCUMENTS

| | | | | |
|---|---|---|---|---|
| 5,774,660 | A | 6/1998 | Brendel et al. | 395/200.31 |
| 5,951,694 | A | 9/1999 | Choquier et al. | 714/15 |
| 6,006,264 | A | 12/1999 | Colby et al. | 709/226 |
| 6,016,305 | A | 1/2000 | Borst et al. | 370/234 |
| 6,128,642 | A | 10/2000 | Doraswamy et al. | 709/201 |
| 6,128,657 | A | 10/2000 | Okanoya et al. | 709/224 |
| 6,137,777 | A | 10/2000 | Vaid et al. | 370/230 |
| 6,185,619 | B1 | 2/2001 | Joffe et al. | 709/229 |
| 6,201,962 | B1 | 3/2001 | Sturniolo et al. | 455/432 |
| 6,249,801 | B1 | 6/2001 | Zisapel et al. | 709/105 |
| 6,263,368 | B1 | 7/2001 | Martin | 709/224 |
| 6,298,383 | B1 | 10/2001 | Gutman et al. | 709/229 |
| 6,327,622 | B1 | 12/2001 | Jindal et al. | 709/228 |
| 6,330,602 | B1 | 12/2001 | Law et al. | 709/224 |
| 6,377,571 | B1 | 4/2002 | Tai | 370/355 |
| 6,377,982 | B1 | 4/2002 | Rai et al. | 709/217 |
| 6,393,458 | B1 | 5/2002 | Gigliotti et al. | 709/203 |
| 6,393,482 | B1 | 5/2002 | Rai et al. | 709/225 |
| 6,400,722 | B1 | 6/2002 | Chuah et al. | 370/401 |
| 6,414,950 | B1 | 7/2002 | Rai et al. | 370/338 |
| 6,421,714 | B1 | 7/2002 | Rai et al. | 709/217 |
| 6,434,618 | B1 | 8/2002 | Cohen et al. | 709/228 |
| 6,442,165 | B1 | 8/2002 | Sitaraman et al. | 370/395.4 |
| 6,466,571 | B1 | 10/2002 | Dynarski et al. | 370/352 |
| 6,473,802 | B2 | 10/2002 | Masters | 709/229 |
| 6,484,143 | B1 | 11/2002 | Swildens et al. | 705/1 |
| 6,512,754 | B2 | 1/2003 | Feder et al. | 370/338 |
| 6,529,501 | B1 | 3/2003 | Zhao et al. | 370/353 |
| 2003/0039232 | A1* | 2/2003 | Casati et al. | 370/337 |
| 2003/0043786 | A1* | 3/2003 | Kall et al. | 370/352 |

(Continued)

OTHER PUBLICATIONS

Shiao-Li Tsao, "Improving packet delivery in GPRS/UMTS networks," Personal, Indoor and Mobile Radio Communications, 2002. The 13th IEEE International Symposium on , vol. 5, No., pp. 2024-2028 vol. 5, Sep. 15-18, 2002.*

(Continued)

*Primary Examiner*—Hassan Kizou
*Assistant Examiner*—Jeffrey M Rutkowski
(74) *Attorney, Agent, or Firm*—Baker Botts L.L.P.

(57) ABSTRACT

A method for enabling a service in a network environment is provided that includes establishing a communication link with an end user and evaluating signaling information associated with the communication link to identify a correlation between the end user and a multicast service group associated with the end user. The correlation may be used to provide one or more multicast services to the end user.

16 Claims, 1 Drawing Sheet

U.S. PATENT DOCUMENTS

| | | | |
|---|---|---|---|
| 2003/0152098 A1* | 8/2003 | Zhu | 370/432 |
| 2003/0187926 A1* | 10/2003 | Karjanlahti | 709/204 |
| 2004/0017809 A1* | 1/2004 | Park | 370/390 |
| 2004/0073928 A1* | 4/2004 | Alakoski et al. | 725/62 |
| 2005/0007969 A1* | 1/2005 | Hundscheidt et al. | 370/312 |
| 2005/0096055 A1* | 5/2005 | Colban et al. | 455/442 |
| 2005/0176404 A1* | 8/2005 | Hundscheidt et al. | 455/406 |
| 2006/0109812 A1* | 5/2006 | Kim et al. | 370/329 |

OTHER PUBLICATIONS

Information Sciences Institute, "Internet Protocol, Darpa Internet Program Protocol Specification," Univ. of Southern California, 49 pgs, Sep. 1981.

S. Deering, "Host Extensions for IP Multicasting," Stanford University, 17 pgs, Aug. 1989.

* cited by examiner

SYSTEM AND METHOD FOR ENABLING MULTICAST GROUP SERVICES IN A NETWORK ENVIRONMENT

TECHNICAL FIELD OF THE INVENTION

This invention relates in general to the field of communications and, more particularly, to a system and a method for enabling multicast group services in a network environment.

BACKGROUND OF THE INVENTION

Networking services have become increasingly important in today's society. One feature of networking services relates to client or source awareness. Certain services, functions, or capabilities may be provided to a group of end users or to clients based on a corresponding source profile or policy. For example, in general packet radio service (GPRS) and universal mobile telecommunication system (UMTS) networks, any number of data services may be provided to a group of mobile wireless users. In certain architectures, mobile service providers may seek to offer multicast services over such networks.

Multicast services allow users to receive information from multicast groups. Devices or components within a network must generally be able to identify an end user or individual before offering such services to the targeted group. Thus, sufficient information must be made available to a network device in order to allow for an accurate identification of a client or a source. Additionally, tools are needed to allow a given end user to join and to leave the selected group. Accordingly, the ability to provide an awareness feature to interested network equipment, while allowing for the joining and leaving of any number of interested participants, presents a significant challenge to network administrators, component manufacturers, and system designers.

SUMMARY OF THE INVENTION

From the foregoing, it may be appreciated by those skilled in the art that a need has arisen for an improved communications approach that provides an awareness function and a join/leave operation for end users included in a multicast group. In accordance with one embodiment of the present invention, a system and a method for identifying information in order to enable group services in a network environment are provided that greatly reduce disadvantages and problems associated with conventional communications techniques.

According to one embodiment of the present invention, there is provided a method for offering multicast services in a communication system that includes establishing a communication link with an end user and evaluating signaling information associated with the communication link to identify a correlation between the end user and a multicast service group associated with the end user. The correlation may be used to provide one or more multicast services to the end user. In a more particular embodiment, the signaling information includes an access point name (APN) that may be used as a basis for the correlation.

Certain embodiments of the present invention may provide a number of technical advantages. For example, according to one embodiment of the present invention, a communications approach is provided that allows an architecture to provide multicast services to an existing general packet radio service (GPRS) or universal mobile telecommunication system (UMTS) network. This may be achieved by an enhancement to the GGSN. Such a modification may be minimal in that it does not impact the end user subscribing to the multicast group or the network.

This operation would allow a device or a component within a network environment to identify a session belonging to a given end user. This could be achieved by matching, for example, access point names (APNs) to multicast groups. This could potentially allow receiving devices and components within the network environment to provide valuable multicast services to a group of end users. Additionally, the GGSN is able to perform join/leave operations for the associated subscribers to multicast groups such that any given communication session may be facilitated or ended in accordance with the wishes of the end user. Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS OF THE INVENTION

Figure 1:
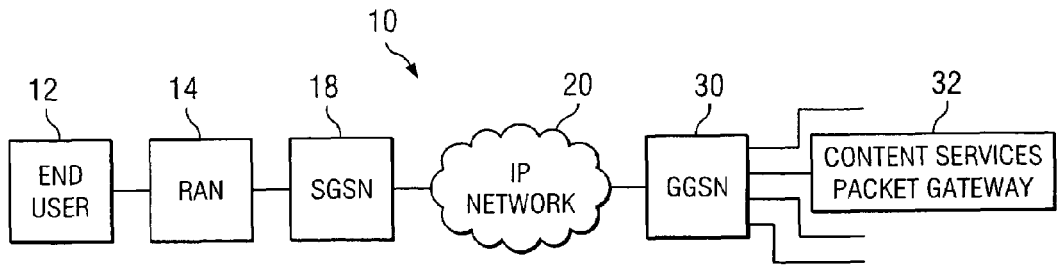
FIG. 1 is a simplified block diagram of a communications system for identifying information in order to enable multicast services in a network environment in accordance with one embodiment of the present invention.

FIG. 1 is a simplified block diagram of a communication system 10 for enabling multicast services in a network environment. Communication system 10 includes an end user 12, a radio access network (RAN) 14, a serving general packet radio service (GPRS) support node (SGSN) 18, and an Internet protocol (IP) network 20. Additionally, communication system 10 includes a gateway GPRS support node (GGSN) 30 and may also include a client services packet gateway (CSPG) 32. FIG. 1 may be generally configured or arranged to represent a 2.5 G communication architecture applicable to a Global System for Mobile (GSM) environment in accordance with a particular embodiment of the present invention. However, the 2.5G architecture is offered for purposes of example only and may alternatively be substituted with any suitable networking protocol or arrangement that provides a communicative platform for communication system 10. For example, communication system 10 may cooperate with any version of a GPRS tunneling protocol (GTP) that could benefit from an ability to provide multicast services to an end user. This may be inclusive of first generation, 2G, and 3G architectures that provide features and services for any end user 12.

In GPRS and universal mobile telecommunication system (UMTS) networks, any number of data services may be provided to a group of end users or subscribers. In certain architectures, mobile service providers may seek to offer multicast services over such networks. IP multicast services allow users to receive information from multicast groups. IP multicasting generally involves sending out data to distributed servers. Multicast services may include items such as financial services, sports information services, and location-based services. Multicast services may also be provided for corporate entities such as FedEx, UPS, and any other entities dispatching information to employees. Any number of other suitable communication flows may also be characterized as multicast services where appropriate and based on particular needs. A wide range of data exchanges may be included in the rubric of 'multicast services' and, accordingly, benefit from the teachings of communication system 10.

For large amounts of data, IP multicast may be more efficient than standard Internet transmissions because a given server can broadcast a message to many recipients simultaneously. Multicast services may include audio and video streaming or, alternatively, involve more simplistic data transfers. Unlike traditional Internet traffic that requires separate connections for each source-destination pair, IP multicasting can allow a plurality of recipients to share the same source. This can translate into one set of packets being transmitted for all the designated destinations. Devices or components within a network must generally be able to identify an end user or individual before offering such selected services to the targeted multicast group.

In accordance with the teachings of the present invention, communication system 10 provides a mechanism that allows GGSN 30 to provide IP multicast service in a network environment. To support IP multicast functions in a GPRS environment, current 3GPP specifications may require: 1) that the underlying network be UMTS or a 3GPP-equivalent release; 2) a given end user device (e.g. a mobile station) to support internet group management protocol (IGMP) and class-D addressing functions; and 3) a given GGSN to support IGMP. Note that IGMP is defined in RFC 3376 as a standard for IP multicasting using the Internet. IGMP may be used to establish host memberships in particular multicast groups on a single network. The mechanisms of the protocol allow a host to inform its local router (or other equivalent element) that it wishes to receive messages addressed to a specific multicast group. Hosts that conform to level two of the IP multicasting specification generally require IGMP.

Communication system 10 may support IP multicast functions in a GPRS environment in the following manner: 1) for existing GPRS networks (e.g. R97, R98 R99 and others), no modification to the user device is necessary; and 2) GGSN 30 is enhanced with multicast capabilities. Based on the GTP signaling and related information (e.g. create/delete packet data protocol (PDP) context, access point name (APN), or any other suitable parameter) GGSN 30 can map APNs to IP multicast groups and, further, perform join/leave operations for the given multicast group. Additionally, GGSN 30 can perform the necessary functions to forward IP multicast traffic to end users subscribed to the selected multicast group. GGSN 30 may behave like a standard multicast router, as viewed towards the IP multicast services infrastructure, such that other components may continue with their standard operations. This allows for minimal overhead in order to achieve the teachings and functionalities of communication system 10. Thus, GGSN 30 may be configured to evaluate GTP signaling and other relevant information (e.g. via communication flows through RADIUS, DIAMETER, TACACS, and GTP'). This information may be used to map APNs to IP multicast groups such that multicast groups are supported in various architectures, such as in GPRS and UMTS networks.

End user 12 is a client or a customer wishing to initiate a communication in communication system 10 via IP network 20. End user 12 may be inclusive of devices used to initiate a communication, such as a computer, a personal digital assistant (PDA), a laptop or an electronic notebook, a telephone, a mobile station, or any other device, component, element, or object capable of initiating voice or data exchanges within communication system 10. End user 12 may also be inclusive of a suitable interface to the human user, such as a microphone, a display, a keyboard, or other terminal equipment (such as for example an interface to a personal computer or to a facsimile machine in cases where end user 12 is used as a modem). End user 12 may also be any device that seeks to initiate a communication on behalf of another entity or element, such as a program, a database, or any other component, device, element, or object capable of initiating a voice or a data exchange within communication system 10. Data, as used herein in this document, refers to any type of numeric, voice, video, audio-visual, or script data, or any type of source or object code, or any other suitable information in any appropriate format that may be communicated from one point to another.

RAN 14 is a communications interface between end user 12 and SGSN 18. RAN 14 may comprise a base transceiver station and a base station controller. The communications interface provided by RAN 14 offers connectivity and allows data to be exchanged between end user 12 and any number of selected elements within communication system 10. RAN 14 facilitates the delivery of a request packet generated by end user 12 and the reception of information sought by end user 12. RAN 14 is only one example of a communications interface between end user 12 and SGSN 18. Other types of communications interfaces may be used for a desired network design based on particular needs.

IP network 20 represents a series of points or nodes of interconnected communication paths for receiving and transmitting packets of information that propagate through communication system 10. IP network 20 offers a communicative interface between end user 12 and GGSN 30 and may be any local area network (LAN), wireless local area network (WLAN), metropolitan area network (MAN), wide area network (WAN), virtual private network (VPN), or any other appropriate architecture or system that facilitates communications in a network environment. IP network 20 implements a user datagram protocol (UDP)/Internet protocol (UDP/IP) communication language protocol in a particular embodiment of the present invention. However, IP network 20 may alternatively implement any other suitable communication protocol for transmitting and receiving data or information within communication system 10.

SGSN 18 and GGSN 30 are network elements that cooperate in order to facilitate a communication session involving end user 12. GGSN 30 is a communication or network node that may be working in conjunction with multiple SGSNs 18 to provide a communications medium in a GPRS service network environment. In operation, end user 12 may bring up a PDP context via SGSN 18 to GGSN 30. The PDP context may be a GPRS data call coming from a GPRS-enabled GSM mobile station in this example scenario. The establishment of the PDP may be done, for example, based on a configured APN through its assigned SGSN 18. The signaling information (e.g. the APN) may then be used by GGSN 30 to match end user 12 with an appropriate multicast group and, further, correlate that group to a multicast service.

GGSN 30 may be inclusive of a walled garden used to control user access to web content or services. GPRS represents a packet-based data bearer service for communication services that may be delivered as a network overlay for any type of suitable network configuration or platform. GPRS generally applies packet-radio and packet switching principles to transfer data packets in an efficient way between GSM elements or units and external packet data networks. GPRS may support multiple Internet communication protocols and may enable existing IP, X.25, frame relay, or any other suitable applications or platforms to operate over GSM connections.

In a particular embodiment of the present invention, GGSN 30 includes software that is operable to evaluate signaling information and other relevant data in order to match APNs to IP multicast groups. Alternatively, these functions may be provided by any suitable hardware, component, device, application specific integrated circuit (ASIC), processor, algorithm, element or object that is operable to perform such operations. Note that in alternative embodiments such a correlation functionality may be provided external to GGSN 30, allowing awareness to be achieved for interested components in the network.

CSPG 32 is a client-aware device that may provide or offer some service or feature to end user 12. Such services may be based on an effective mapping between a source IP address of a given request packet and a user profile. Client-aware devices may key off the source IP address in providing services to an end user. There are a number of reasons why a device or a component would want to identify end user 12. For example, some devices may wish to identify end user 12 for authorization or quality of service purposes. In another example, a device may wish to maintain user profiles to provide for accounting records (for example per-user accounting) or to provide for content billing operations. Alternatively, a device or a component may use an identification to provide for any other type of suitable client-aware service, tool, or feature according to the particular needs of network components or equipment. Additional services may be related to areas such as routing, accounting, firewalling, filtering, or any other suitable parameters or policies where user-aware characteristics serve as a basis for service implementation.

CSPG 32 represents a generic piece of network equipment that benefits from knowing the identity of end user 12. CSPG 32 could be a wireless application protocol (WAP) gateway, a compression and/or optimization engine, a billing engine (inclusive of per-content billing), a service enforcement element, a content authorization component, a policy enforcement gateway, or any other element that is operable to modify, process, or transform data or information in a network environment. CSPG 32 represents any component, device, element or object that can benefit from having PDP awareness information.

As described above, CSPG 32 utilizes the identity of the client or the end user to provide services based on a source profile. In a particular embodiment of the present invention, CSPG 32 provides client-aware services by operating at networking layers two and three. Accordingly, the information available at networking layers two and three provides a basis for the identification of an end user or a client. CSPG 32 may use an IP address or any other suitable parameter to uniquely identify a client or an end user in offering a service, enhanced capability, or feature to an end user. CSPG 32 may include any suitable hardware, software, components, or elements that identify a unique identifier in order to provide some networking feature or capability to an end user.

Figure 2:
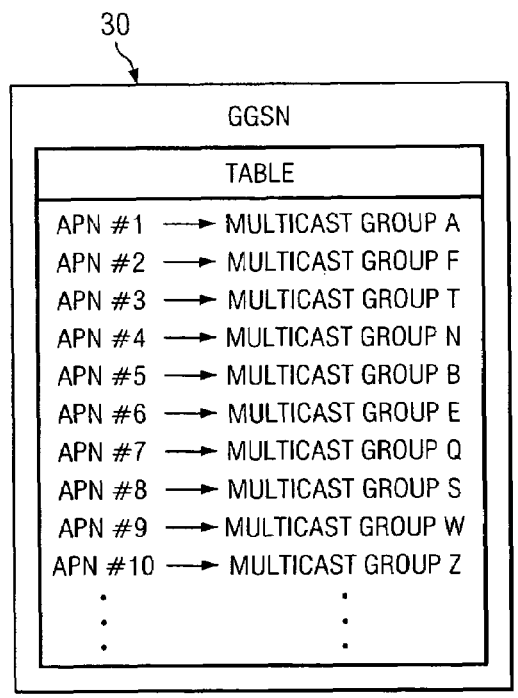
FIG. 2 is a simplified block diagram of a table for storing information in the communication system.

FIG. 2 is a simplified block diagram illustrating a table 40 included within GGSN 30 in an example implementation of communication system 10. Table 40 may be created and stored within or external to GGSN 30. Table 40 may store selected signaling information collected by GGSN 30. The information may be used to match APNs to multicast groups for any given end user's IP address, profile, or policy. Table 40 could include (and be indexed by) APN number, policy/profile, source IP address, destination IP address, protocol, IP address of end user 12, source and destination ports, or quality of service characteristics. These elements may be used to differentiate subscribers. The profile or policy within table 40 may identify to which multicast group end user 12 belongs. Additional information may include subscriptions, payment plans, or any other information relevant to providing a multicast service to end user 12.

Entries within table 40 may be cleaned up, deleted, or updated periodically (or alternatively updated or changed based on some event or modification to system parameters) in order to accurately reflect one or more source profiles associated with one or more end users. Entries could also be deleted specifically or deleted per communications flow or per PDP.

Figure 3:
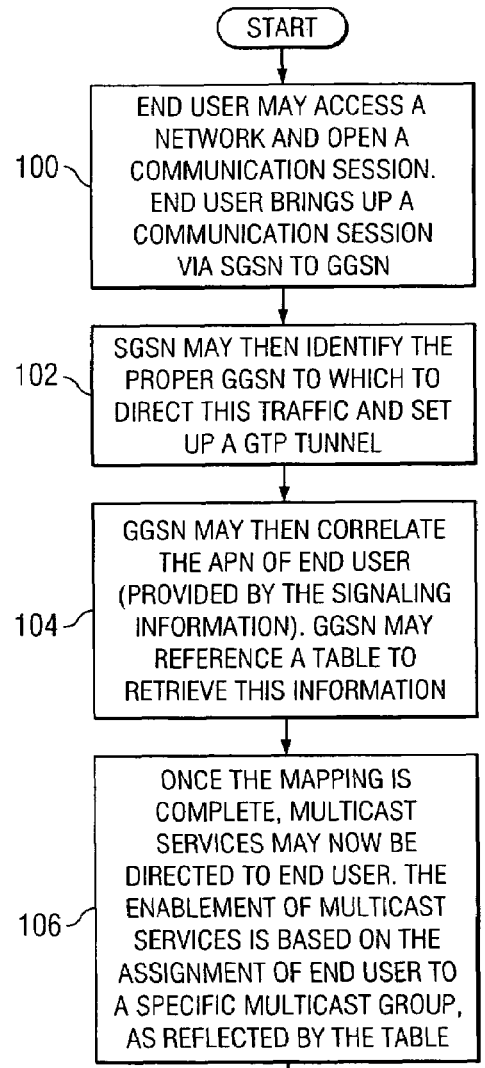
FIG. 3 is a simplified flowchart illustrating a series of example steps associated with a method for identifying information in order to enable multicast services in the communication system.

FIG. 3 is a simplified flowchart illustrating a series of example steps associated with a method for enabling multicast services in a network environment. The method begins at step 100 where end user 12 may access a network and open a communication session (e.g. a PDP context potentially having a certain set of parameters or vectors that describe quality of service, security, etc.). End user 12 may use a specific device and APN when opening up a communication session. For example, the communication session may be a GPRS data call coming from a GPRS-enabled GSM mobile station. The APN included in the signaling information may be any suitable element that identifies end user 12. For example, the APN identifier may be a company name followed by a period and then the term 'multicast' (e.g. CocaCola.com.multicast). The signaling information may also include other user identification data and, for example, the user's IP address or a unicast address.

Thus, end user 12 brings up a communication session via SGSN 18 to GGSN 30. The establishment of the communication session may be executed based on the configured APN through its assigned SGSN 18. SGSN 18 may then identify the proper GGSN to which to direct this traffic and, also, set up a GTP tunnel at step 102. GGSN 30 may then trigger the multicast operation and recognize that end user 12 belongs to a designated multicast group.

GGSN 30 may correlate the APN of end user 12 (provided by the signaling information) at step 104. GGSN 30 may reference any appropriate location to retrieve this information that allows for such a matching function to be achieved (e.g. via table 40). Once the mapping is complete, multicast services may now be directed to end user 12 at step 106. GGSN 30 may now forward selected information to end user 12: the information being associated with a given multicast service. GGSN 30 may signal to other network elements (e.g. routers) that end user 12 belongs to a given group and that information designated for that group should be sent to end user 12 via GGSN 30. When a server (e.g. a video server or an MP3 server) attempts to send multicast packets, the packets may propagate toward GGSN 30. GGSN 30 may match the APN to its associated multicast group in order to forward the appropriate multicast packets to end user 12.

GGSN 30 may replicate the incoming multicast packets such that the multicast packets are delivered to each tunnel associated with a member of the multicast group: the participants being identified by table 40. Thus, the enablement of multicast services is based on the assignment of end user 12 to a specific multicast group, as reflected by table 40. End user 12 may now receive appropriate multicast services via the network.

Note that the example of FIG. 3 has been offered for purposes of teaching only. Accordingly, some of these steps may be changed, deleted, or replaced with other steps where appropriate. Such modifications may be based on particular communication needs or specific communication architectures and configurations and are within the teachings of the present invention.

Although the present invention has been described in detail with reference to particular embodiments, it should be understood that various other changes, substitutions, and alterations may be made hereto without departing from the spirit and scope of the present invention. For example, although the present invention has been described as operating in GPRS or UMTS environments, the present invention may be used in any networking environment that routes or processes information based on the identity of or subscriptions associated with end user 12. The protocol disclosed in the preceding figures is generally applicable to all communication systems in which information packets are routed between or through IP networks. Note also that although specific protocols are described herein in this document to illustrate example operations, any suitable communicative platforms may be used to effectuate the operations, which provide an ability to provide multicast services for communication system 10.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. An apparatus for enabling a service in a network environment, comprising:
    a gateway general packet radio service (GPRS) support node (GGSN) operable to:
        establish a communication link with an end user;
        receive signaling information through the communication link, the signaling information comprising an access point name (APN) identifying the end user;
        recognize that the end user belongs to a designated multicast service group;
        correlate the APN to the multicast service group to provide one or more multicast services to the end user;
        store the correlation between the APN and the multicast service group in a table within the GGSN;
        inform a network element to send any packets designated for the multicast service group to the GGSN;
        receive a plurality of packets designated for the multicast service group from the network element; and
        determine the APN correlated to the multicast service group to forward the plurality of packets to the end user.

2. The apparatus of claim 1, further comprising:
    a table included within the GGSN and operable to store the correlation between the end user and the multicast service group associated with the end user.

3. The apparatus of claim 1, wherein one or more of the multicast services is provided in a selected one of an audio stream format and a video stream format.

4. The apparatus of claim 1, wherein the GGSN is further operable to perform joining and leaving operations associated with the end user joining and leaving one or more multicast service group communication sessions.

5. The apparatus of claim 1, wherein the GGSN is further operable to forward Internet protocol (IP) multicast traffic associated with the multicast service group to the end user.

6. The apparatus of claim 1, wherein the GGSN is further operable to replicate one or more packets associated with a selected one of the multicast services and to deliver the packets to one or more communication tunnels associated with one or more end users that belong to the multicast service group.

7. A method for enabling a service in a network environment, comprising:
    establishing a communication link with an end user;
    receiving, at a gateway general packet radio service (GPRS) support node (GGSN), signaling information through the communication link, the signaling information comprising an access point name (APN) identifying the end user;
    recognizing, by the GGSN, that the end user belongs to a designated multicast service group;
    correlating the APN to the multicast service group to provide one or more multicast services to the end user;
    storing the correlation between the APN and the multicast service group in a table within the GGSN;
    informing, by the GGSN, a network element to send any packets designated for the multicast service group to the GGSN;
    receiving, at the GGSN, a plurality of packets designated for the multicast service group from the network element; and
    determining, by the GGSN, the APN correlated to the multicast service group to forward the plurality of packets to the end user.

8. The method of claim 7, further comprising:
    storing the correlation between the end user and the multicast service group associated with the end user in a table.

9. The method of claim 7, further comprising:
    performing joining and leaving operations associated with the end user joining and leaving one or more multicast service group communication sessions.

10. The method of claim 7, further comprising:
    forwarding Internet protocol (IP) multicast traffic associated with the multicast service group to the end user.

11. The method of claim 7, further comprising:
    replicating one or more packets associated with a selected one of the multicast services; and
    delivering the packets to one or more communication tunnels associated with one or more end users that belong to the multicast service group.

12. Software for enabling a service in a network environment, the software being embodied in a computer readable medium and comprising computer code such that when executed is operable to:
    establish a communication link with an end user;
    receive, at a gateway general packet radio service (GPRS) support node (GGSN), signaling information through the communication link, the signaling information comprising an access point name (APN) identifying the end user;

recognize, by the GGSN, that the end user belongs to a designated multicast service group;

correlate the APN to the multicast service group to provide one or more multicast services to the end user;

store the correlation between the APN and the multicast service group in a table within the GGSN;

inform, by the GGSN, a network element to send any packets designated for the multicast service group to the GGSN;

receive, at the GGSN, a plurality of packets designated for the multicast service group from the network element; and determine, by the GGSN, the APN correlated to the multicast service group to forward the plurality of packets to the end user.

13. The medium of claim 12, wherein the code is further operable to:

store the correlation between the end user and the multicast service group associated with the end user in a table.

14. The medium of claim 12, wherein the code is further operable to:

perform joining and leaving operations associated with the end user joining and leaving one or more multicast service group communication sessions.

15. The medium of claim 12, wherein the code is further operable to:

forward Internet protocol (IP) multicast traffic associated with the multicast service group to the end user.

16. The medium of claim 12, wherein the code is further operable to:

replicate one or more packets associated with a selected one of the multicast services; and deliver the packets to one or more communication tunnels associated with one or more end users that belong to the multicast service group.

\* \* \* \* \*

UNITED STATES PATENT AND TRADEMARK OFFICE
CERTIFICATE OF CORRECTION

PATENT NO.        : 7,596,107 B1                     Page 1 of 1
APPLICATION NO.   : 10/766180
DATED             : September 29, 2009
INVENTOR(S)       : Laurent H. Andriantsiferana It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1254 days.

Signed and Sealed this

Twenty-eighth Day of September, 2010

David J. Kappos
*Director of the United States Patent and Trademark Office*